United States Patent
Hutin (12)

(10) Patent No.: US 9,024,777 B2
(45) Date of Patent: May 5, 2015

(54) ACTIVE COMPENSATION FOR MUD TELEMETRY MODULATOR AND TURBINE

(75) Inventor: Remi Hutin, New Ulm, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 655 days.

(21) Appl. No.: 13/297,833

(22) Filed: Nov. 16, 2011

(65) Prior Publication Data

US 2012/0148417 A1 Jun. 14, 2012

Related U.S. Application Data

(60) Provisional application No. 61/421,272, filed on Dec. 9, 2010.

(51) Int. Cl.
| | |
|---|---|
| *G01V 3/00* | (2006.01) |
| *E21B 47/18* | (2012.01) |
| *E21B 47/12* | (2012.01) |
| *E21B 47/01* | (2012.01) |
| *F16J 15/16* | (2006.01) |
| *F16J 15/32* | (2006.01) |

(52) U.S. Cl.
CPC .............. *E21B 47/182* (2013.01); *E21B 47/011* (2013.01); *E21B 47/18* (2013.01); *F16J 15/164* (2013.01); *F16J 15/3296* (2013.01)

(58) Field of Classification Search
CPC ....... G01V 11/002; E21B 47/12; E21B 47/18; E21B 47/182
USPC ............ 175/25, 24, 40, 48; 340/854.5, 853.1, 340/854.3, 854.4; 367/85, 83; 417/44.2
See application file for complete search history.

(56) References Cited

U.S. PATENT DOCUMENTS

| | | | | | |
|---|---|---|---|---|---|
| 4,184,545 | A | * | 1/1980 | Claycomb | ...................... 166/113 |
| 4,297,880 | A | * | 11/1981 | Berger | ........................ 73/152.22 |
| 4,483,394 | A | * | 11/1984 | Peppers et al. | ................. 166/113 |

(Continued)

FOREIGN PATENT DOCUMENTS

| | | | |
|---|---|---|---|
| GB | 2290320 | | 12/1995 |
| GB | 2290320 A | * | 12/1995 .............. E21B 47/18 |

(Continued)

OTHER PUBLICATIONS

T. Lasseter, M. Karakas, J. Schweitzer, "Interpreting an RFT-Measured Pulse Test with a Three-Dimensional Simulator," SPE 14878, Mar. 1988.

(Continued)

*Primary Examiner* — Alexander Comley
(74) *Attorney, Agent, or Firm* — Chadwick A. Sullivan; Wesley Noah

(57) ABSTRACT

An arrangement having a piston configured to move along an axial pathway a rotating seal configured to seal an inside environment from an outside environment, the rotating seal configured to be acted upon by a pressure exerted from the piston, a differential pressure sensor measuring a pressure difference between a first fluid from the outside environment and a second fluid on the inside environment, a motor connected to the piston, the motor configured to actuate the piston to a position along an axial pathway and an electronic feedback control system connected to the motor, the electronic feedback system configured to interface with the differential pressure sensor and maintain a pressure generated by the piston onto the rotating seal to a desired pressure.

13 Claims, 2 Drawing Sheets

(56) References Cited

U.S. PATENT DOCUMENTS

| | | | |
|---|---|---|---|
| 4,535,429 A * | 8/1985 | Russell et al. | 367/85 |
| 4,628,495 A * | 12/1986 | Peppers et al. | 367/85 |
| 4,630,243 A * | 12/1986 | MacLeod | 367/82 |
| 4,734,892 A * | 3/1988 | Kotlyar | 367/83 |
| 4,734,893 A * | 3/1988 | Claycomb | 367/85 |
| 4,742,498 A * | 5/1988 | Barron | 367/85 |
| 4,802,150 A * | 1/1989 | Russell et al. | 367/85 |
| 5,586,084 A * | 12/1996 | Barron et al. | 367/85 |
| 5,679,894 A * | 10/1997 | Kruger et al. | 73/152.03 |
| 5,883,447 A | 3/1999 | Clausin | |
| 6,016,288 A * | 1/2000 | Frith | 367/85 |
| 6,469,637 B1 * | 10/2002 | Seyler et al. | 340/856.3 |
| 6,604,582 B2 * | 8/2003 | Flowers et al. | 166/332.1 |
| 6,714,138 B1 * | 3/2004 | Turner et al. | 340/854.3 |
| 7,083,008 B2 * | 8/2006 | Thorp et al. | 175/57 |
| 7,327,634 B2 * | 2/2008 | Perry et al. | 367/84 |
| 7,468,679 B2 * | 12/2008 | Feluch | 340/855.4 |
| 2005/0231383 A1 | 10/2005 | Pratt et al. | |
| 2005/0260089 A1 * | 11/2005 | Hahn et al. | 417/505 |
| 2006/0254819 A1 * | 11/2006 | Moriarty | 175/40 |
| 2009/0133930 A1 * | 5/2009 | Thorp et al. | 175/25 |
| 2009/0173493 A1 * | 7/2009 | Hutin et al. | 166/250.01 |
| 2009/0301780 A1 | 12/2009 | Gearhart et al. | |
| 2010/0110833 A1 * | 5/2010 | Close | 367/83 |
| 2011/0011594 A1 * | 1/2011 | Young et al. | 166/321 |

FOREIGN PATENT DOCUMENTS

| | | | |
|---|---|---|---|
| WO | 01/94750 | 12/2001 | |
| WO | 2009/033146 | 3/2009 | |
| WO | WO 2009033146 A2 * | 3/2009 | E21B 47/18 |

OTHER PUBLICATIONS

G.F. Bunn, L.M. Yaxley, "Design, Implementation, and Interpretation of a Three-Dimensional Well Test in the Cormorant Field, North Sea", SPE 15858, Oct. 1986.

J. Saeedi, E. Standen, "Layer Pulse Testing Using a Wireline Formation Tester," SPE 16803 Sep. 1987.

G.F. Bunn, M.J. Wittman, W.D. Morgan, R.C. Curnutt, "Distributed Pressure Measurements Allow Early Quantification of Reservoir Dynamics in the Jene Field," SPE 17682, Mar. 1991.

L.M. Yaxley, J.M. Blaymires, "A Field Example of Interference Testing Across a Partially Communicating Fault," SPE 19306, 1989.

R. Kaneda, J. Saeedi, L.C. Ayestaran, "Interpretation of a Pulse Test in a Layered Reservoir," SPE 19306, Dec. 1991.

* cited by examiner

ACTIVE COMPENSATION FOR MUD TELEMETRY MODULATOR AND TURBINE

CROSS-REFERENCE TO RELATED APPLICATIONS

The present application seeks priority to U.S. Provisional Application 61/421,272, filed Dec. 9, 2010, the entirety of which is incorporated by reference.

FIELD OF THE INVENTION

Aspects described relate to mud pulse telemetry. More specifically, aspects relate to active compensation for mud pulse telemetry for drilling operations.

BACKGROUND INFORMATION

Designs for measure-while-drilling ("MWD") siren telemetry modulators are based on a rotating seal with drilling fluid ("mud") on one side of the seal and another fluid, generally an oil, on the opposite side of the seal. Compensation for changes in oil temperature or pressure across the seal is done by a reactive spring system in conventional systems. The reactive spring system attempts to limit particulate contamination within the telemetry modulator by providing a sealing pressure between the rotating seal and the body of the modulator. The spring system is provided with a spring constant, "K", that provides a specified reaction force. The greater the deflection of the spring system from its intended bearing point, the greater the force the spring system exerts to bring the spring system back into a desired position.

Such conventional designs and systems for sealing modulators are not without problems. Problems associated with these systems include failure of the sealing system, allowing contaminants to affect system operation. Such conventional systems are expensive to produce, not withstanding their physical limitations. Production of high quality springs can be troublesome and springs can break or fatigue under many repeated cycles. Repeated forces/loadings, over time, can cause the reactive spring system to eventually fail. Such systems have a further drawback of not being able to react quickly enough to changes in temperature or pressure of the fluid. Late reaction in changes to temperature and pressure causes repeated cycles of stress that can lead to over-pressurization or failure of components within the system. Moreover, reactive spring systems are purely reactive and can not anticipate loadings. These reactive spring systems deflect once the loading is placed upon the system. These systems have no potential anticipatory loading capability.

There are many systems that can be used to reduce vibrations or to improve vibration resistance. Such systems include shock absorbers for automobiles that allow control of unequal damping over time. In an example embodiment, provided in U.S. Pat. No. 5,883,447, two active masses are provided that are driving in a planar motion, an arrangement of two flexible cylindrical plates and a plurality of motors. Systems may also be used that provide configurations of electrically active/magnetically active fluids that provide progressive resistance over time, rather than use a mechanical spring action force mechanism. Such systems, however, must be very carefully controlled and are not applicable for use in high temperature environments or other harsh conditions.

In an alternative system, described in U.S. Pat. No. 7,083,008, a reactive compensation system is provided for a borehole device that attempts to provide compensation but still has significant drawbacks.

There is a need to provide a system that can withstand repeated forces and loadings over time that is easy and cost effective to produce.

BRIEF DESCRIPTION OF THE DRAWINGS

So that aspects can be understood in detail, a more particular description may be had by reference to the embodiments thereof that are illustrated in the drawings. It is to be noted, however, that the drawings illustrate only typical embodiments and are therefore not to be considered limiting of its scope, for the description may admit to other equally effective embodiments. Dimensions of various features may be arbitrarily increased or reduced for clarity of discussion.

DETAILED DESCRIPTION

Figure 1:
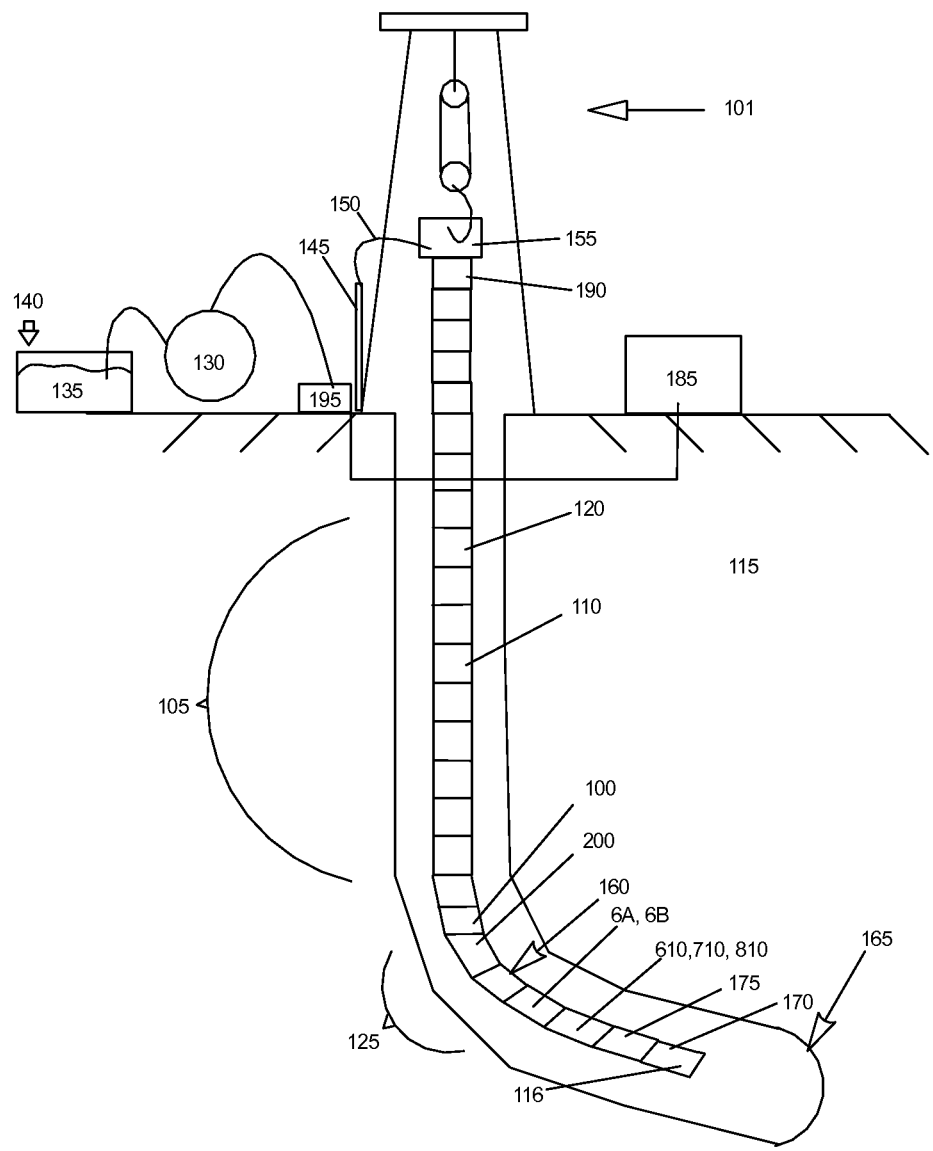
FIG. 1 is a cross-sectional drawing of a drilling rig in conformance with one aspect described.

It will be understood that the following disclosure provides many different embodiments, or examples, for implementing different features of various embodiments. Specific examples of components and arrangements are described below to simplify the present disclosure. These are, of course, merely examples and are not intended to be limiting. In addition, this disclosure may repeat reference numerals and/or letters in the various examples. This repetition is for the purpose of simplicity and clarity and does not itself dictate a relationship between the various embodiments and/or configurations discussed. Moreover, the subterranean formation of a first feature over or on a second feature in the description that may include embodiments in which the first and second features are formed in direct contact, and may also include embodiments in which additional features may be formed interposing the first and second features, such that the first and second features may not be in direct contact.

In accordance with the present disclosure, a wellsite with associated wellbore and apparatus is described in order to describe a typical, but not limiting, embodiment of the application. To that end, apparatus at the wellsite may be altered, as necessary, due to field considerations encountered.

An example well site system is schematically depicted in FIG. 1 wherein components described above are incorporated in the larger systems described therein. The well site comprises a well. A drill string 105 may extend from the drill rig 101 into a zone of the formation of reservoir 115. The drill string 105 employs the mud pulse telemetry system 100, described later, for transmitting data from downhole to the surface.

The drill string 105 may also incorporate any type of telemetry system or any combination of telemetry systems, such as electromagnetic, mud pulse, acoustic and\or wired drill pipe, however in the preferred embodiment, only the mud pulse telemetry system 100 is used. A bottom hole assembly is suspended at the end of the drill string 105. In one non-limiting embodiment, the bottom hole assembly comprises a plurality of measurement-while-drilling or logging-while-drilling downhole tools 125, as illustrated in FIG. 1 such as shown by numerals 6a and 6b. For example, one or more of the downhole tools 6a and 6b may be a formation pressure while drilling tool.

Logging-while-drilling tools used at the end of the drill string 105 may include a thick walled housing, commonly referred to as a drill color, and may include one or more of a number of logging devices. The logging-while-drilling tool may be capable of measuring, processing, and/or storing information therein, as well as communicating with equipment disposed at the surface of the well site.

Measurement-while-drilling tools may include one or more of the following measuring tools: a modulator, a weight-on-bit measuring device, a torque measuring device, a vibration measuring device, a shock measuring device, a stick slip measuring device, a direction measuring device, and inclination measuring device, and\or any other device.

Measuring made by the bottom hole assembly or other tools and sensors with the drill string 105 may be transmitted to a surface computing system 185 for analysis. For example, mud pulses may be used to broadcast formation measurements performed by one or more of the downhole tools 6a and 6b to the surface computing system 185.

The surface computing system 185 is configured to host a plurality of models, such as a reservoir model, and to acquire and process data from downhole components, as well as determine the bottom hole location in the reservoir 115 from measurement while drilling data. Examples of reservoir models and cross well interference testing may be found in the following references: "Interpreting an RFT-Measured Pulse Test with a Three-Dimensional Simulator" by Lasseter, T., Karakas, M., and Schweitzer, J., SPE 14878, March 1988. "Design, Implementation, and Interpretation of a Three-Dimensional Well Test in the Cormorant Field, North Sea" by Bunn, G. F., and Yaxley, L. M., SPE 15858, October 1986. "Layer Pulse Testing Using a Wireline Formation Tester" by Saeedi, J., and Standen, E., SPE 16803, September 1987. "Distributed Pressure Measurements Allow Early Quantification of Reservoir Dynamics in the Jene Field" by Bunn, G. F., Wittman, M. J., Morgan, W. D., and Curnutt, R. C., SPE 17682, March 1991. "A Field Example of Interference Testing Across a Partially Communicating Fault" by Yaxley, L. M., and Blaymires, J. M., SPE19306, 1989. "Interpretation of a Pulse Test in a Layered Reservoir" by Kaneda, R., Saeedi, J., and Ayestaran, L. C., SPE 19306, December 1991.

The drill rig 101 or similar functioning device may be used to move the drill string 105 within the well that is being drilled through subterranean formations of the reservoir, generally at 115 in FIG. 1. The drill string 105 may be extended into the subterranean formations with a number of coupled drill pipes (one of which is designated 120) of the drill string 105. The drill pipe comprising the drill string 105 may be structurally similar to ordinary drill pipes, as illustrated for example and U.S. Pat. No. 6,174,001, issued to Enderle, entitled "Two-Step, a Low Torque, Wedge Thread for Tubular Connector," issued Aug. 7, 2001, which is incorporated herein by reference in its entirety, and include a cable associated with each drill pipe 120 that serves as a communication channel.

The bottom hole assembly at the lower end of the drill string 105 may include one, an assembly, or a string of downhole tools. In the illustrated example, the downhole tool string 105 may include well logging tools 125 coupled to a lower end thereof. As used in the present description, the term well logging tool or a string of such tools, may include at least one or more logging while drilling tools ("LWD"), formation evaluation tools, formation sampling tools and other tools capable of measuring a characteristic of the subterranean formations of the reservoir 115 and\or of the well.

Several of the components disposed proximate to the drill rig 101 may be used to operate components of the system. These components will be explained with respect to their uses in drilling the well 110 for a better understanding thereof. The drill string 105 may be used to turn and actually urge a drill bit 116 into the bottom the well 110 to increase its length (depth). During drilling of the well 110, a pump 130 lifts drilling fluid (mud) 135 from a tank 140 or pits and discharges the mud 135 under pressure through a standpipe 145 and flexible conduit 150 or hose, through a top drive 155 and into an interior passage inside the drill string 105. The mud 135, which can be water or oil-based, exits the drill string 105 through courses or nozzles (not shown separately) in the drill bit 116, wherein the mud cools and lubricates the drill bit 116 and lifts drill cuttings generated by the drill bit 116 to the surface of the earth through an annular arrangement.

When the well 110 has been drilled to a selected depth, the well logging tools 125 may be positioned at the lower end of the drill string 105 if not previously installed. The well logging tools 125 may be positioned by pumping the well logging tools 125 down the drill string 105 or otherwise moving the well logging tools 125 down the pipe while the drill string 105 is within the well 110. The well logging tools 125 may then be coupled to an adapter sub 160 at the end of the drill string 105 and may be moved through, for example in the illustrated embodiment, a highly inclined portion 165 of the well 110, which would be inaccessible using armored electrical cable to move the well logging tools 125.

During well logging operations, the pump 130 may be operated to provide fluid flow to operate one or more turbines in the well logging tools 125 to provide power to operate certain devices in the well logging tools 125. However, when tripping in or out of the well 110, it may be unfeasible to provide fluid flow. As a result, power may be provided to the well logging tools 125 in other ways. For example, batteries may be used to provide power to the well logging tools 125. In one embodiment, the batteries may be rechargeable batteries and may be recharged by turbines during fluid flow. The batteries may be positioned within the housing of one or more of the well logging tools 125. Other manners of powering the well logging tools 125 may be used including, but not limited to, one-time power use batteries.

As the well logging tools 125 are moved along the well 110 by moving the drill string 105, signals may be detected by various devices, of which non-limiting examples may include a resistivity measurement device, a bulk density measurement device, a porosity measurement device, a formation capture cross-section measurement device 170, a gamma ray measurement device 175 and a formation fluid sampling tool 610, 710, 810 which may include a formation pressure measurement device 6a and/or 6b. The signals may be transmitted toward the surface of the earth along the drill string 105.

An apparatus and system for communicating from the drill string 105 to the surface computer 185 or other component configured to receive, analyze, and/or transmit data may include a second adapter sub 190 that may be coupled between an end of the drill string 105 and the top drive 155 that may be used to provide a communication channel with a receiving unit 195 for signals received from the well logging tools 125. The receiving unit 195 may be coupled to the surface computer 185 to provide a data path therebetween that may be a bidirectional data path.

Though not shown, the drill string 105 may alternatively be connected to a rotary table, via a Kelly, and may suspend from a traveling block or hook, and additionally a rotary swivel. The rotary swivel may be suspended from the drilling rig 101 through the hook, and the Kelly may be connected to the rotary swivel such that the Kelly may rotate with respect to the rotary swivel.

An upper end of the drill string 105 may be connected to the Kelly, such as by threadingly reconnecting the drill string 105 to the Kelly, and the rotary table may rotate the Kelly, thereby rotating the drill string connected thereto.

Although not shown, the drill string 105 may include one or more stabilizing collars. A stabilizing collar may be disposed within or connected to the drill string 105, in which the stabilizing collar may be used to engage and apply a force against the wall of the well 110. This may enable the stabilizing collar to prevent the drill string 105 from deviating from the desired direction for the well 110. For example, during drilling, the drill string 105 may "wobble" within the well 110, thereby allowing the drill string 105 to deviate from the desired direction of the well 110. This wobble action may also be detrimental to the drill string 105, components disposed therein, and the drill bit 116 connected thereto. A stabilizing collar may be used to minimize, if not overcome altogether, the wobble action of the drill string 105, thereby possibly increasing the efficiency of the drilling performed at the well site and/or increasing the overall life of the components at the wellsite.

Figure 2:
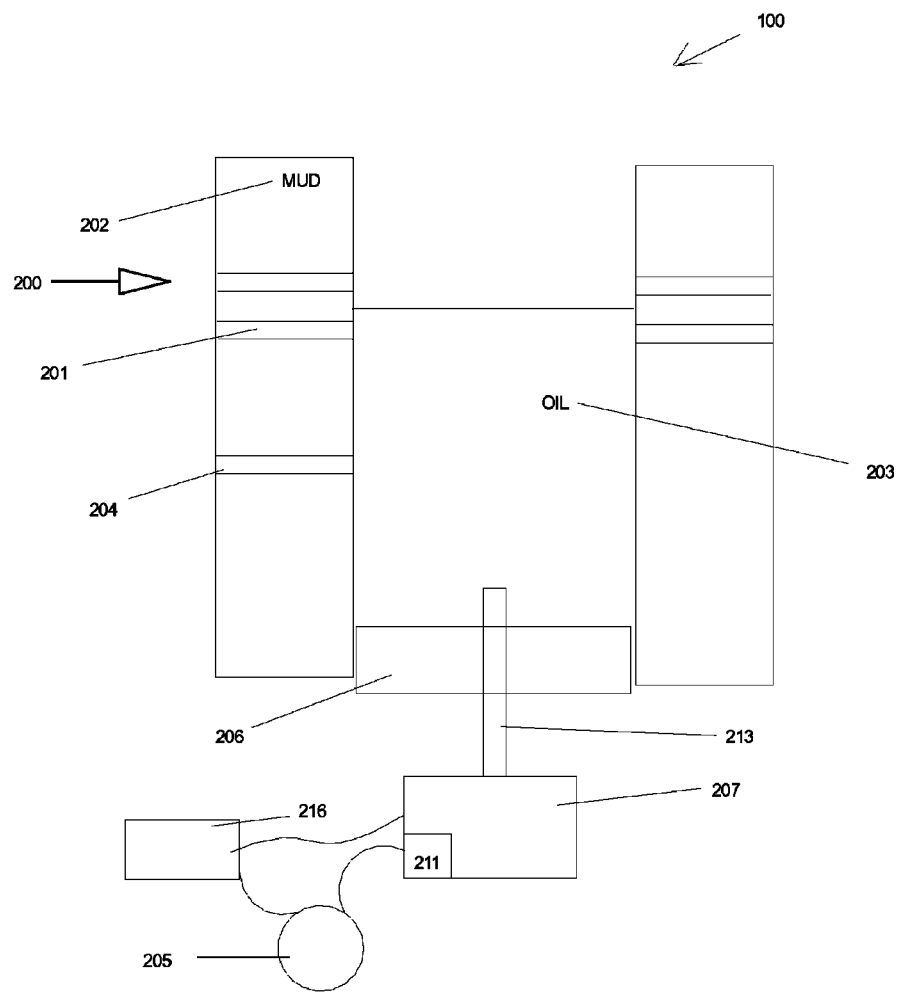
FIG. 2 is a cross-sectional drawing of an active compensation arrangement for mud pulse telemetry.

In the illustrated embodiment provided in FIG. 2, the active compensation system for a mud pulse telemetry modulator 200 is based on a differential pressure sensor across the seal 201 and a feedback system to control the pressure in the oil chamber through components arranged around a rotating seal. The feedback system can be based on either an electrical motor controlling a piston or a hydraulic system controlled by a small electrical valve or any other system as described below.

Referring to FIG. 2, an active compensation system 200 for a mud pulse telemetry modulator using a motor activated piston is illustrated. A differential pressure sensor 204 is positioned to measure a pressure between a mud side 202 and an oil side 203. This measured value is compared to a set point pressure to be obtained across a seal 201. The seal may be a rotating seal and will be described as a rotating seal in the embodiments described. In other embodiments, the seal may be a stationary seal. This set point for the rotating seal is optimized to improve the life and the mean time between failure ("MTBF") of the rotating seal 201. The rotating seal 201 is configured to separate an inside environment from an outside environment. An error signal is used to control the piston position using an electrical motor 207 wherein the error signal indicates a measured pressure value in excess of the set point value. The bandwidth of this pressure feedback system 205, in the non-limiting example embodiment, is at least 40 Hz to cancel the pressure changes due to telemetry and/or drilling. A prior knowledge of the modulation signal can be added to the feedback to increase the bandwidth of the loop.

In an alternative configuration, the differential pressure sensor 204 can be located as close to the seal 201 as possible to minimize the delay and increase the bandwidth of the system.

The setting of the delta P value (the overall change in pressure) may be done through an electronic connection between an outside source and the electronic feedback control system 205, or the electronic feedback control system 205 may be configured with a memory that may be programmed such that a delta P value is already stored in the memory. The differential pressure sensor 204 may be two absolute pressure sensors, wherein a first sensor measures a mud pressure and a second sensor is configured to measure an oil pressure.

The electronic feedback control system 205 is configured as an arrangement that accepts signals, such as a delta P value or/and a modulation signal, as well as a measurements from a pressure sensor. The system 205 interfaces with the piston 206 to actuate the piston 206 an appropriate amount. The piston 206 is configured to move along an axial pathway to create a pressure used on the seal.

Upon actuation of the piston 206, the piston 206 interfaces with the oil 203 in the system to provide shock absorption capabilities. The piston 206 is activated by a motor 207 that is configured to receive electrical input from the electronic feedback control system 205. The piston 206 may be part of a reciprocating pump system, for example, for high performance pumping of fluid into and out of the piston cylinder. The piston 206 may be connected to the motor 207 through a connecting rod 213 that is allowed to rotate within the body of the piston 206.

In the illustrated embodiment, the motor 207 is a direct drive motor that is fed a DC current. In an alternative configuration, the motor 207 may be an alternating current AC motor driven by an alternating current. In the illustrated embodiment of a direct drive DC motor, a brushless DC motor is used that uses a rotating permanent magnet in a rotor and a set of stationary electrical magnets placed in a motor housing. A motor controller 211 is provided that turns DC current into AC current, as needed for movement of the piston 206. While a brushless motor is used to enhance long life of the entire unit, other designs are possible and the system disclosed should not be considered limiting.

When a brushed DC motor 207 is used, the permanent magnets of the system may be stationary and rotating electrical magnets may be used.

In the instance where an alternating current ("AC") motor is provided, the motor may be a synchronous unit or may be an induction unit. The magnetic field produced may be a single or three phase motor, as necessary, as non-limiting embodiments.

The differential pressure sensor 204 is configured to measure a difference between two pressures namely the mud side on an outside environment and the oil side on an inside environment. The differential pressure sensor 204, in conjunction with other components of the system, is configured such that the oil pressure (high side) is maintained at a slightly higher overall pressure than the mud side (low side). Such a configuration minimizes penetration of materials into the system 200, causing component failure.

The differential pressure sensor 204, in the illustrated embodiment, may have a differential pressure range of up to 1000 psi [70 Bar] and may be constructed with high strength stainless steel. The differential pressure sensor 204 may also be configured such that use of internal O rings is eliminated so that failure of the unit will not be catastrophic. Moreover, the internals of the differential pressure sensor 204 may be configured such that use of internal fluid cavities, such as for Mercury (Hg), is minimized or eliminated to provide for limited fluid contamination in the event of failure.

A battery 216 may be provided to the overall system 200 to allow power to be provided to the motor 207 for actuation. The battery 216 may be a one time use unit or may be a rechargeable unit, allowing for more continuous operation of the overall system. To that end, the battery 216 may be recharged through a fluid driven turbine, in one example embodiment or the battery 216 may be deleted and replaced by a direct powering fluid turbine. The battery 216 may employ such features as rapid recharge capabilities and may be a lithium ion battery, nickel cadmium or other rechargeable configuration. The battery 216 may also provide several cells so there is redundancy of power production capabilities. In embodiments provided, arrangements may be used to anticipate loadings on the seal 201, wherein spikes or depressions in pressure may be communicated to the overall arrangement to allow accurate estimate for the loadings that the seal 201 will undergo. Correspondingly, pressure may be created by the piston 206 to occur at the same time the pressure fluctuation will reach the seal 201.

In one example embodiment, a system is provided comprising a piston configured to move along an axial pathway, a rotating seal configured to seal an inside environment from an outside environment, the rotating seal configured to be acted upon by a pressure exerted from the piston, a differential pressure sensor measuring a pressure difference between a first fluid from the outside environment and a second fluid on the inside environment, a motor connected to the piston, the motor configured to actuate the piston to a position along an axial pathway and an electronic feedback control system connected to the motor, the electronic feedback system configured to interface with the differential pressure sensor and maintain a pressure generated by the piston onto the rotating seal to a desired pressure.

In another example embodiment, the system is provided such that the motor is a DC motor. In another example embodiment, the arrangement further comprises a battery connected to the motor. In another example embodiment, the system is provided such that the electronic feedback control system is configured with a non-volatile memory that is addressable and programmable.

In another example embodiment, the mud telemetry arrangement, comprising a piston configured to move along an axial pathway, a rotating seal configured to seal an inside environment from an outside environment, the rotating seal configured to be acted upon by a pressure exerted from the piston, at least two absolute pressure sensors, wherein a first of the sensors is configured to measure a mud pressure in a wellbore on the outside environment and a second of the at least two sensors is configured to measure an oil pressure in the inside environment, a motor connected to the piston, the motor configured to actuate the piston to a position along an axial pathway, and an electronic feedback control system connected to the motor, the electronic feedback system configured to interface with the at least two absolute pressure sensors and maintain a pressure generated by the piston onto the rotating seal to a desired pressure.

In another example embodiment, the arrangement is provided such that the motor is a DC motor. The arrangement may further comprise a battery connected to the motor. In another example embodiment, the arrangement is provided such that the electronic feedback control system is configured with a non-volatile memory that is addressable and programmable.

In another example embodiment, an arrangement is provided comprising a hydraulic system configured with an electronically controlled actuating valve to respond to a pressure, a rotating seal configured to seal an inside environment from an outside environment, the rotating seal configured to be acted upon by a pressure from the hydraulic system, at least two absolute pressure sensors, wherein a first of the sensors is configured to measure a mud pressure and a second of the sensors is configured to measure an oil pressure, and an electronic feedback control system, the electronic feedback system configured to interface with the at least two absolute pressure sensors and maintain a pressure generated by the hydraulic system onto the rotating seal to a desired pressure.

In another example embodiment, the arrangement is provided wherein the motor is a DC motor. The arrangement may also further comprise a battery connected to the motor. The arrangement may also be configured wherein the electronic feedback control system is configured with a non-volatile memory that is addressable and programmable.

In another example embodiment, the arrangement is provided wherein the electronic feedback control system connected to the motor is configured to interface with the differential pressure sensor such that the piston is actuated at approximately a same time as a loading force is applied to the rotating seal.

In another example embodiment, the arrangement is provided wherein the electronic feedback control system connected to the motor is configured to interface with the at least two absolute pressure sensors such that the piston is actuated at approximately a same time as a loading force is applied to the rotating seal.

In another example embodiment, the arrangement is provided wherein the electronic feedback control system is configured to interface with the hydraulic system configured with the electronic valve to respond to a pressure at least two absolute pressure sensors such that the hydraulic system is actuated at approximately a same time as a loading force is applied to the rotating seal.

In another example embodiment, the arrangement is provided wherein the electronically controlled actuating valve is a needle valve. In a further example embodiment, the arrangement is provided wherein the electronic feedback control system is further configured to accept input signals from a computer.

In another example embodiment, the arrangement is provided wherein the differential pressure sensor measuring the pressure difference between the first fluid from the outside environment and the second fluid on the inside environment is configured withstand at least 70 Bar differential pressure.

In another example embodiment, the arrangement is provided wherein the differential pressure sensor measuring the pressure difference between the first fluid from the outside environment and the second fluid on the inside environment is configured without an O ring configuration.

In another example embodiment, the arrangement is provided wherein the differential pressure sensor measuring the pressure difference between the first fluid from the outside environment and the second fluid on the inside environment is configured with at least one output connector to interface with the electronic feedback control system.

The foregoing outlines feature of several embodiments so that those skilled in the art may better understand the aspects of the disclosure. Those skilled in the art should appreciate that they may readily use the present disclosure as a basis for designing or modifying other processes and structure for carrying out the sample purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A downhole drilling system, comprising:
    a piston configured to move along an axial pathway in an oil filled chamber;
    a rotating seal configured to seal the oil filled chamber from an outside environment, the rotating seal configured to be acted upon by a pressure exerted by the piston;
    a differential pressure sensor measuring a pressure difference between drilling fluid in the outside environment and oil in the oil filled chamber;
    a motor connected to the piston, the motor configured to actuate the piston to a position along the axial pathway; and
    an electronic feedback control system connected to the motor and the differential pressure sensor, the electronic feedback system configured to interface with the differential pressure sensor and adjust the position of the piston along the axial pathway to maintain a desired differential pressure on the rotating seal.

2. The system according to claim 1, wherein the motor is a DC motor.

3. The system according to claim 1, further comprising:
a battery connected to the motor.

4. The system according to claim 1, wherein the electronic feedback control system is configured with a non-volatile memory that is addressable and programmable.

5. The system according to claim 1, wherein the electronic feedback control system connected to the motor is configured to interface with the differential pressure sensor such that the piston is actuated at approximately a same time as a loading force is applied to the rotating seal.

6. The arrangement according to claim 1, wherein the differential pressure sensor measuring the pressure difference between the drilling fluid in the outside environment and the oil in the inside environment is configured to withstand at least 70 bar differential pressure.

7. The arrangement according to claim 1, wherein the differential pressure sensor measuring the pressure difference between the drilling fluid in the outside environment and the oil in the inside environment is configured without an O-ring configuration.

8. The arrangement according to claim 1, wherein the differential pressure sensor measuring the pressure difference between the drilling fluid in the outside environment and the oil in the inside environment is configured with at least one output connector to interface with the electronic feedback control system.

9. A mud telemetry arrangement, comprising: a piston configured to move along an axial pathway in an oil filled chamber; a rotating seal configured to seal the oil filled chamber from an outside environment, the rotating seal configured to be acted upon by a pressure exerted by the piston; at least two absolute pressure sensors, wherein a first of the sensors is configured to measure a mud pressure in a wellbore on the outside environment and a second of the at least two sensors is configured to measure an oil pressure in the oil filled chamber; a motor connected to the piston, the motor configured to actuate the piston to a position along the axial pathway; and an electronic feedback control system connected to the motor and the absolute pressure sensors, the electronic feedback system configured to interface with the at least two absolute pressure sensors and adjust the position of the piston along the axial pathway to maintain a desired differential pressure on the rotating seal.

10. The mud telemetry arrangement according to claim 9, wherein the motor is a DC motor.

11. The mud telemetry arrangement according to claim 9, further comprising:
a battery connected to the motor.

12. The mud telemetry arrangement according to claim 9, wherein the electronic feedback control system is configured with a non-volatile memory that is addressable and programmable.

13. The arrangement according to claim 9, wherein the electronic feedback control system connected to the motor is configured to interface with the at least two absolute pressure sensors such that the piston is actuated at approximately a same time as a loading force is applied to the rotating seal.

* * * * *